United States Patent [19]

Woll et al.

[11] Patent Number: 5,581,464
[45] Date of Patent: Dec. 3, 1996

[54] RECORDING OF OPERATIONAL EVENTS IN AN AUTOMOTIVE VEHICLE

[75] Inventors: Jerry D. Woll, Poway; Bryan D. Woll, Laguna Niguel; Van R. Malan, La Jolla, all of Calif.

[73] Assignee: Vorad Safety Systems, Inc.

[21] Appl. No.: 320,603

[22] Filed: Oct. 11, 1994

Related U.S. Application Data

[63] Continuation of Ser. No. 930,158, Aug. 14, 1992, abandoned.

[51] Int. Cl.⁶ .................................................. G06F 13/00
[52] U.S. Cl. ............................... 364/424.04; 364/551.01; 340/438; 340/459; 180/287
[58] Field of Search ......................... 364/424.03, 424.04, 364/550, 551.01, 424.05, 426.04; 340/435, 436, 438, 441, 459, 825.31; 180/287

[56] References Cited

U.S. PATENT DOCUMENTS

| | | | |
|---|---|---|---|
| 3,461,429 | 8/1969 | Gray | 364/424.04 X |
| 4,067,061 | 1/1978 | Juhasz | 364/424.04 |
| 4,072,850 | 2/1978 | McGlynn | 364/424.04 |
| 4,258,421 | 3/1981 | Juhasz et al. | 364/424.04 |
| 4,271,402 | 6/1981 | Kastura et al. | 364/424.04 X |
| 4,344,136 | 8/1982 | Panik | 364/424.04 |
| 4,677,429 | 6/1987 | Glotzbach | 364/424.04 X |
| 4,754,255 | 6/1988 | Sanders et al. | 340/825.31 X |
| 4,805,722 | 2/1989 | Keating et al. | 180/287 |
| 4,853,859 | 8/1989 | Morita et al. | 364/424.04 |
| 4,926,331 | 5/1990 | Windle et al. | 364/424.04 |
| 4,939,652 | 7/1990 | Steiner | 364/424.04 |
| 5,014,200 | 5/1991 | Chundrlik et al. | 364/426.04 |
| 5,046,007 | 9/1991 | McCrery et al. | 364/424.04 |
| 5,050,080 | 9/1991 | Abe | 364/424.04 |
| 5,185,700 | 2/1993 | Bezos et al. | 364/424.04 |
| 5,250,761 | 10/1993 | Koyanagi | 364/424.04 X |
| 5,303,163 | 4/1994 | Ebaugh et al. | 364/550 |

FOREIGN PATENT DOCUMENTS

WO84/03785  9/1984  WIPO.

*Primary Examiner*—Collin W. Park
*Attorney, Agent, or Firm*—Baker, Maxham, Jester & Meador

[57] ABSTRACT

An apparatus and method for recording operational events in an automotive radar system. The invention provides an Event Recording Apparatus (ERA) that records selectable vehicle performance, operational status, and/or environment information, including information useful for accident analysis and updated software for use by a system processor capable of reading data from the ERA. The preferred embodiment of the ERA comprises a non-volatile solid-state memory card, a memory card adapter located in a vehicle, and a microprocessor, either as part of the memory card or embedded in a system within the vehicle, for controlling the storage of data within the memory card. The ERA is configured to store such vehicle information as the closing rate between the recording vehicle and targets located by the vehicle's radar system, distance between the recording vehicle and targets, vehicle speed, and such vehicle operational status and environment information as braking pressure, vehicle acceleration or deceleration, rate of turning, steering angle, hazard levels determined from a radar system processor, target direction, cruise control status, vehicle engine RPM, brake temperature, brake line hydraulic pressure, windshield wiper status, fog light status, defroster status, and geographic positioning information. In addition, the ERA can be configured to function as a common trip monitor, recording distance travelled, average speed, miles-per-gallon, fuel remaining, compass direction of travel, etc. The device can also record vehicle maintenance information, such as oil temperature, engine temperature, transmission fluid temperature, and engine timing.

28 Claims, 5 Drawing Sheets

RECORDING OF OPERATIONAL EVENTS IN AN AUTOMOTIVE VEHICLE

This is a continuation of application Ser. No. 07/930,158 filed on Aug. 14, 1992, now abandoned.

BACKGROUND OF THE INVENTION

1. Field of the Invention

This invention relates to automotive radar systems, and more particularly to an apparatus and method for recording operational events in an automotive radar system.

2. Description of Related Art

In the automotive field, a number of electronic devices exist that record data on various aspects of vehicle performance and/or environment information. Such devices have used magnetic tape and paper strips to record such information. These devices primarily function as trip monitors, storing information such as trip distance, trip time, miles per gallon consumed, and average speed.

A drawback of such devices is that magnetic tapes and paper strips are susceptible to the detrimental effects of heat and vibration commonly found in an automotive environment. A further drawback is that prior art automotive recording devices have not been used in conjunction with an automotive radar system to record such information as the closing rate (CR) between the recording vehicle and targets located by the vehicle's radar system, the distance (D) between the recording vehicle and targets, vehicle speed (VS), and such vehicle performance and environment information as braking pressure, vehicle acceleration or deceleration in one or more dimensions, rate of turning of the vehicle, steering angle, hazard levels determined from a radar system processor, target direction, and cruise control status, to name a few.

Further, it is believed that such automotive recording devices have not been used to record information to be used for accident reconstruction.

Most commercial aircraft and some private aircraft are equipped with an event recording device commonly called a "black box". This device records pertinent data from the aircraft's major subsystems as the aircraft is operating. If an accident occurs, the "black box" generally can be retrieved from the aircraft and the recorded information extracted to determine the status of subsystems of the aircraft just before the accident. Such information is then used to reconstruct the events leading up to the accident, and can help determine the cause of the accident. Black box recording devices have proven invaluable in aircraft accident reconstruction. However, this type of technology is quite expensive, and its use has been limited to more expensive vehicles such as aircraft. In addition, it is believed that all such devices operate using a cumbersome magnetic tape to record data. These devices also tend to be larger, heavier, and consume more power than would be acceptable for automotive use.

In the area of automobile accident reconstruction, an accident analyst determines how an accident most probably occurred by measuring, among other things, the length of skid marks, the extent of vehicle and nearby property damage, and the condition of the road at the time of the accident. This method of reconstructing accidents has been shown to be expensive and inaccurate at times. Accordingly, it would be desirable for automotive vehicles to have a system that would function as an event recording "black box". Such a system should record information relating to the vehicle and the environment around the vehicle prior to an accident. Such data should be readable after an accident for use in reconstructing the events leading up to the accident. An accident could then be reconstructed using real historical data, as opposed to post-accident estimated data.

In addition to recording data useful for accident reconstruction, it would also be desirable for such a device to record more standard vehicle performance, operational status, and/or environment data. In addition, it would be desirable that such a device be configurable for a driver's particular preferences, or to provide an authorization function that prohibits unauthorized personnel from driving the vehicle, and/or to provide a convenient means for upgrading system-wide software for an automotive electronic control system or an automotive radar system.

The present invention meets these objects and provides an advance over the prior art.

SUMMARY OF THE INVENTION

The preferred embodiment of the present invention is particularly well-adapted to be used in conjunction with an automotive radar system. The invention provides a removable, externally readable, non-volatile solid-state memory Event Recording Apparatus (ERA) that records selectable vehicle performance, operational status, and/or environment information. In particular, the ERA records information useful for accident analysis.

In addition, the preferred embodiment of the present invention can be used to store updated software for use by a system processor capable of reading data from the ERA.

More particularly, the preferred embodiment of the inventive ERA comprises a non-volatile solid-state memory card, a memory card adapter located in a vehicle, and a microprocessor, either as part of the memory card or embedded in a system within the vehicle, for controlling the storage of data within the memory card. The ERA system is configured to store such vehicle information as, for example, the closing rate (CR) between the recording vehicle and targets located by the vehicle's radar system, the distance (D) between the recording vehicle and targets, vehicle speed (VS), and such vehicle performance and environment information as braking pressure, vehicle acceleration or deceleration in one or more dimensions, rate of turning of the vehicle, steering angle, hazard levels determined from a radar system processor, target direction, cruise control status, vehicle engine RPM, brake temperature, brake line hydraulic pressure, windshield wiper status (to determine if it is raining), fog light status, defroster status, and geographic positioning information (e.g., from a global positioning system). In addition, the ERA can be configured to function as a common trip monitor, recording such information as distance travelled, average speed, miles- per-gallon, fuel remaining, compass direction of travel, etc. The device can also record vehicle maintenance information, such as coolant temperature, oil temperature, engine temperature, transmission fluid temperature, engine timing, and more.

The details of the preferred embodiment of the present invention are set forth in the accompanying drawings and the description below. Once the details of the invention are known, numerous additional enhancements and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 1:
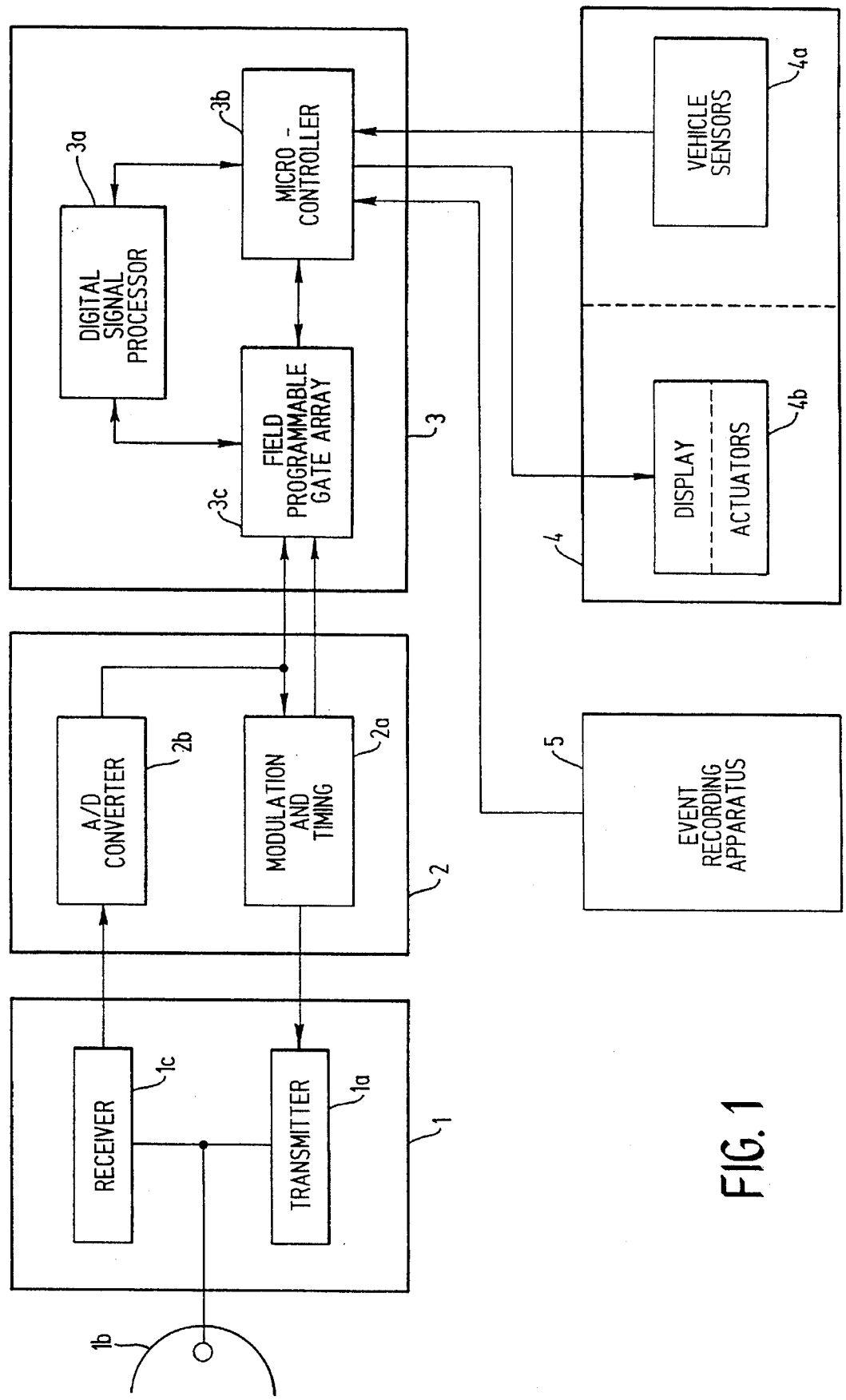
FIG. 1 is an overall block diagram showing the invention being used in conjunction with an automotive radar system using digital signal processing.

FIG. 1 is an overall block diagram showing the invention being used in conjunction with an automotive radar system using digital signal processing. Such a system is described in greater detail in co-pending U.S. Pat. No. 5,302,956, entitled MULTIFREQUENCY, MULTI-TARGET AUTOMOTIVE RADAR SYSTEM USING DIGITAL SIGNAL PROCESSING and assigned to the assignee of the present invention. This radar system is referenced by way of example. However, the invention could be readily adapted to be used in conjunction with other automotive radar systems known in the art, such as the systems described in U.S. Pat. No. 4,673,937, entitled AUTOMOTIVE COLLISION AVOIDANCE AND/OR AIR BAG DEPLOYMENT RADAR, and U.S. Pat. No. 4,916,450, entitled RADAR SYSTEM FOR HEAD-WAY CONTROL OF A VEHICLE, both of which are assigned to the assignee of the present invention.

Using the present ERA invention in conjunction with such a radar system allows recording of important data relating to obstacles in the path of the vehicle that were detected by the radar system. This type of information is particularly useful in accident reconstruction.

Referring to FIG. 1, a receiver/transmitter module 1 transmits a Doppler radar signal from a radar transmitter 1a via a radar antenna 1b, and receives reflected radar echoes in a receiver 1c through the antenna 1b. A control module 2 coupled to the receiver/transmitter module 1 contains a modulation and timing circuit 2a that controls the transmission of the Doppler radar beam, and an A/D converter 2b for converting the received echo signal into a digital data stream. A signal processing module 3 includes a digital signal processor (DSP) 3a, a microcontroller 3b, and a field programmable gate array 3c, configured to control the flow of digital radar data to the DSP 3a under the control of the microcontroller 3b. The signal processing module 3 is also coupled to an input/output module 4.

The input/output module 4 which provides information from a variety of vehicle sensors 4a to the microcontroller 3b for use in calculating the hazard level presented by targets indicated from the received radar signal and/or to indicate the operational status and environment of the vehicle. Commonly known sensors may be used, for example, to measure vehicle speed, engine temperature, oil pressure, engine RPM, oil temperature, transmission fluid temperature, coolant temperature, and other values relating to the environment or performance of the vehicle. The signal processing unit 3 itself generates information from the transmitted and received radar signal, such as the closing rate (CR) of a target with respect to the vehicle, the distance (D) of various targets, and the direction of movement (towards or away from) of the targets with respect to the vehicle. Additional information can be obtained by providing other sensors, such as a brake pedal pressure sensor, brake hydraulic line pressure sensor, tire pressure, accelerometer sensors (for example, fore and aft acceleration/deceleration, and/or left and right (yaw) acceleration of the vehicle), turning rate, turn angle, and/or impact sensors (such as the type used to trigger vehicle air bags), windshield wiper status (to determine if it is raining), fog light status, defroster status, and geographic positioning information. Recording some or all of this data or similar relevant data would make accident reconstruction more reliable and less expensive.

The input/output module 4 also has a display and/or actuators 4b, for displaying indications to a user and/or controlling various aspects of vehicle operation (for example, flashing a dashboard warning light to a user if a vehicle is approaching too rapidly, and/or, in extreme conditions, automatically activating the vehicle brakes and/or air bag).

Also coupled to the microcontroller 3b is an Event Recording Apparatus (ERA) 5, described more fully below.

Figure 2:
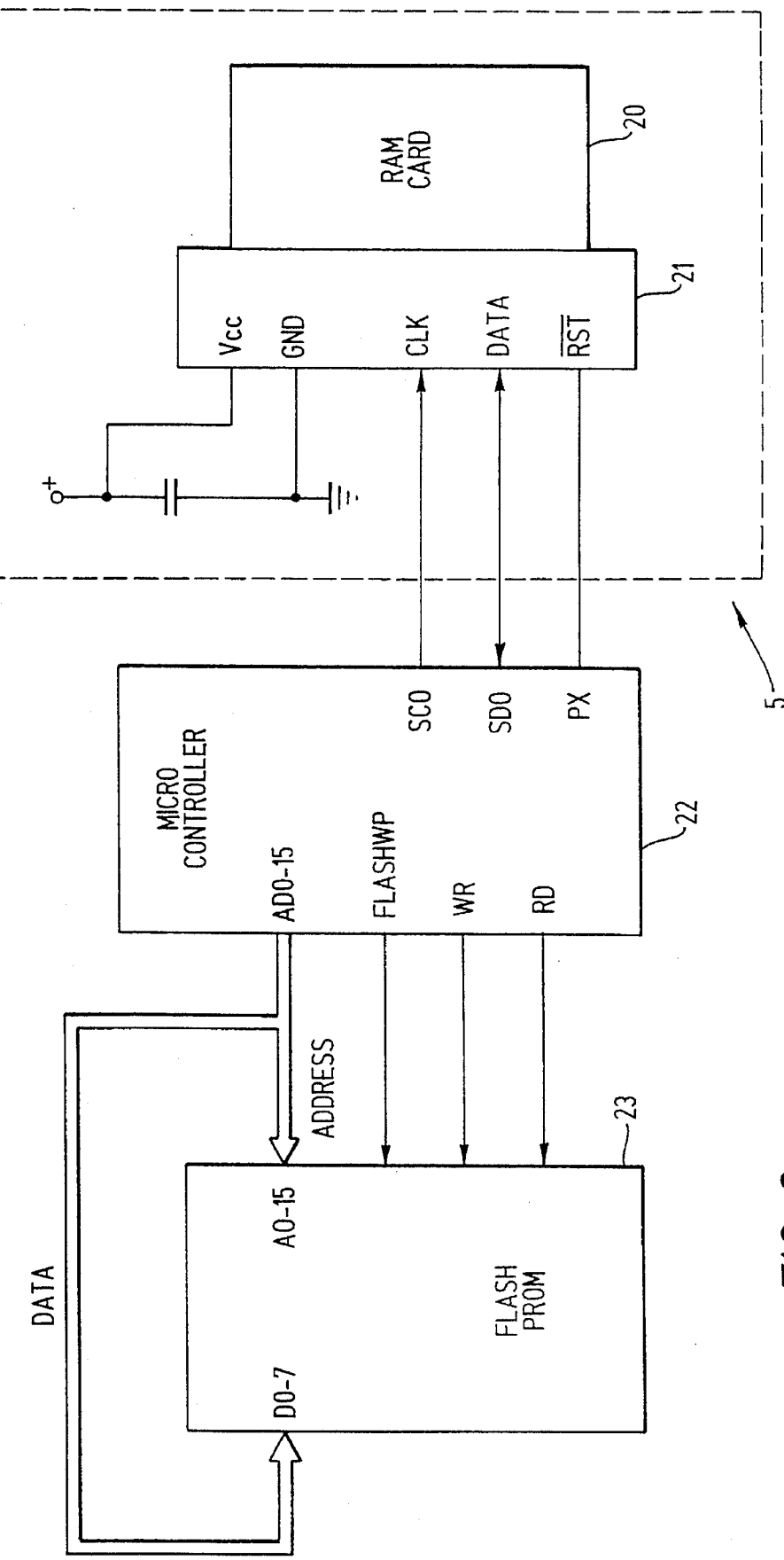
FIG. 2 is a block diagram of a RAM card in accordance with the present invention, shown connected to the radar system microcontroller and a non-volatile memory device.

FIG. 2 shows a more detailed block diagram of the preferred embodiment of the present ERA invention, showing a RAM card 20 coupled through an interface receptacle 21 to a microcontroller 22 (which may be the microcontroller 3b shown in FIG. 1, but can be an independent microcontroller coupled to the microcontroller 3b). In the preferred embodiment, the microcontroller 22 includes a real-time clock. The microcontroller 22 is also coupled to a non-volatile memory device 23. "Non-volatile" means that the data stored in the memory device 23 will be retained even if power is interrupted to the device. In the preferred embodiment, the memory device 23 is a "flash" programmable memory device available from a number of suppliers. Such devices are electrically alterable, but retain their data even after power is removed from the device. Alternatively, the memory device 23 may comprise, for example, dynamic RAM with a battery backup and refresh circuitry, static RAM with a battery backup, electrically alterable read-only memory, or other solid-state, non-volatile memory technologies known in the art.

The microcontroller 22 and non-volatile memory device 23 are coupled in known fashion by Address and Data buses, and read/write control lines FLASHWP, RD, WR, as shown, such that the microcontroller 22 can read data from, and write data to, the non-volatile memory device 23. The memory device 23 is preferably used to store programs to be executed by the microcontroller 22 for control of all, or various aspects, of the components shown in FIG. 1.

In the preferred embodiment, the interface between the RAM card receptacle 21 and the microcontroller 22 is kept as simple as possible. Preferably, a standard 3-wire (not including power and ground) serial interface bus is used, which has a clock line CLK for the data transfer clock, a DQ line bidirectional data line, and an $\overline{RST}$ line to enable/disable the RAM card 20. The 3-wire bus is coupled to the microcontroller 22 as shown.

An advantage of the simple 3-wire serial interface bus preferred for use with the present invention is that it is well known, simple to implement, and requires a minimum amount of interface connection between the RAM card 20 and the microcontroller 22. However, other interfaces could be used, such as the more complete RS232 serial interface standard. As another alternative, the RAM card receptacle 21 could be an adapter compatible with the Personal Computer Memory Card International Association (PCMCIA) interface. As yet another alternative, a fiber optic connection could be used, which would give the system greater immunity from electromagnetic interference.

The RAM card 20 comprises one or more non-volatile memory devices and appropriate control and interface circuitry. The RAM card 20 may comprise, for example, dynamic RAM with a battery backup and refresh circuitry, static RAM with a battery backup, flash memory devices, electrically alterable read-only memory, or other solid-state, non-volatile memory technologies known in the art. The data storage capacity of the RAM card 20 is a matter of design choice and available integrated circuit chip capacity and size. In the illustrated embodiment, the capacity of the RAM card 20 is at least 32 kBytes.

The RAM card 20 may be custom designed, or may be a commercial product. In the preferred embodiment of the present invention, the RAM card 20 comprises a model DS6417 "CyberCard" from Dallas Semiconductor, Inc.

Figure 3:
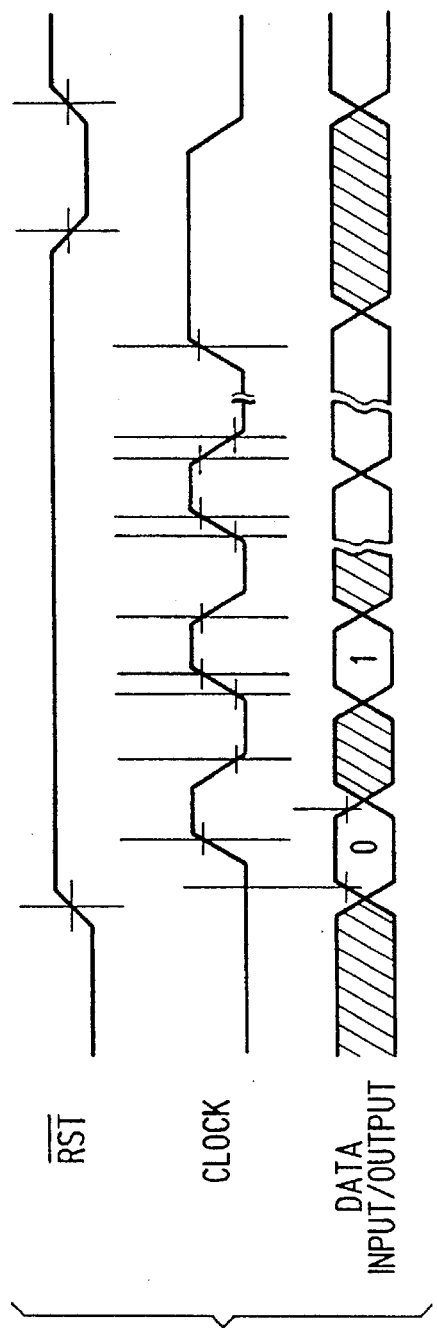
FIG. 3 is a timing diagram of a Write cycle to a RAM card in accordance with the present invention.
Figure 4:
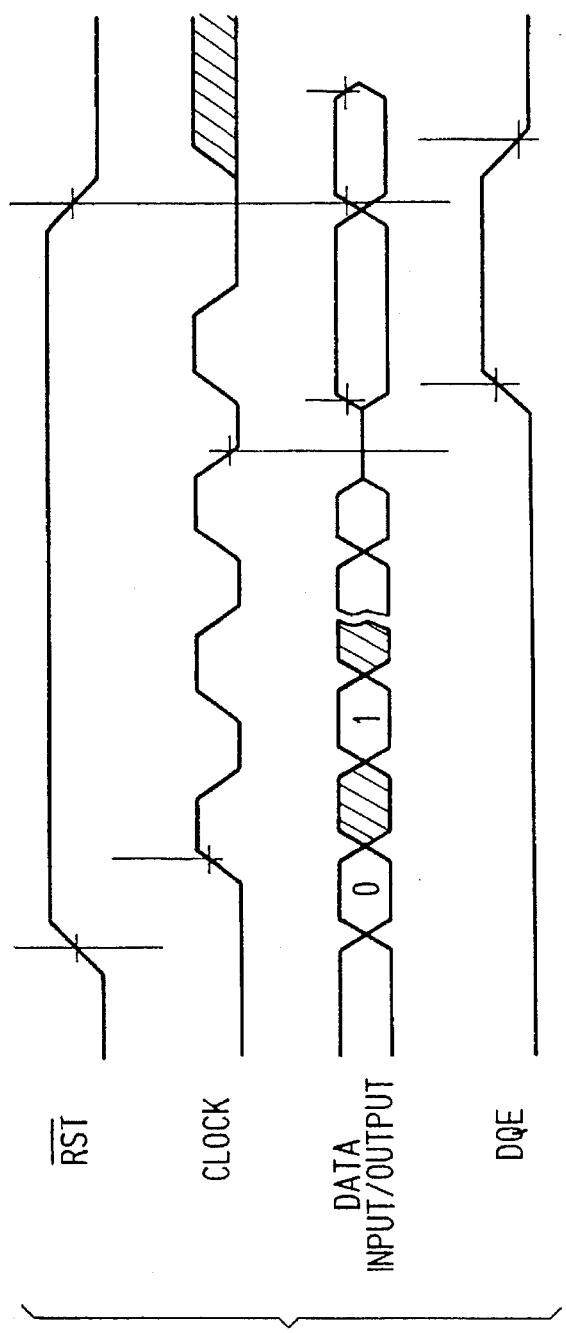
FIG. 4 is a timing diagram of a Read cycle from a RAM card in accordance with the present invention.

In the preferred embodiment, the microcontroller 22 begins a data transfer to the RAM card 20 by sending a 56-bit protocol word to the RAM card 20. Referring to FIGS. 3 and 4, all data transfers to and from the RAM card 20 are initiated by setting the $\overline{RST}$ input to a logical "1". Each data transfer is terminated by resetting the $\overline{RST}$ signal to a logical "0". In the preferred embodiment, the protocol word includes a command byte, 2 bytes for the starting address where data storage or retrieval will begin, and a cyclic redundancy check (CRC) byte or word that ensures all bits have been transmitted correctly.

After the desired operation (e.g., Read or Write) is specified by the 56-protocol word, a first byte is read from or written to the designated address a bit at a time. The address is then automatically incremented to the next location, and a next byte is read or written. As desired, the microcontroller 22 can write any data from the non-volatile memory device 23 to the RAM card 20, or vice versa.

Referring to FIG. 3, for a Write cycle to the RAM card 20, the data input bits and the command word bits on the DQ line must be valid during the rising edge of the clock signal CLK. Referring to FIG. 4, for a Read cycle from the RAM card 20, data bits read out of the RAM card 20 must be valid during the falling edge of the clock signal CLK. When data transfers are terminated by the reset of the $\overline{RST}$ signal, the transition of the $\overline{RST}$ signal from a logical "1" to a logical "0" must occur during a logical "1" state of the clock signal CLK. This simple protocol ensures a generally error-free transfer of data to and from the RAM card 20.

Figure 5:
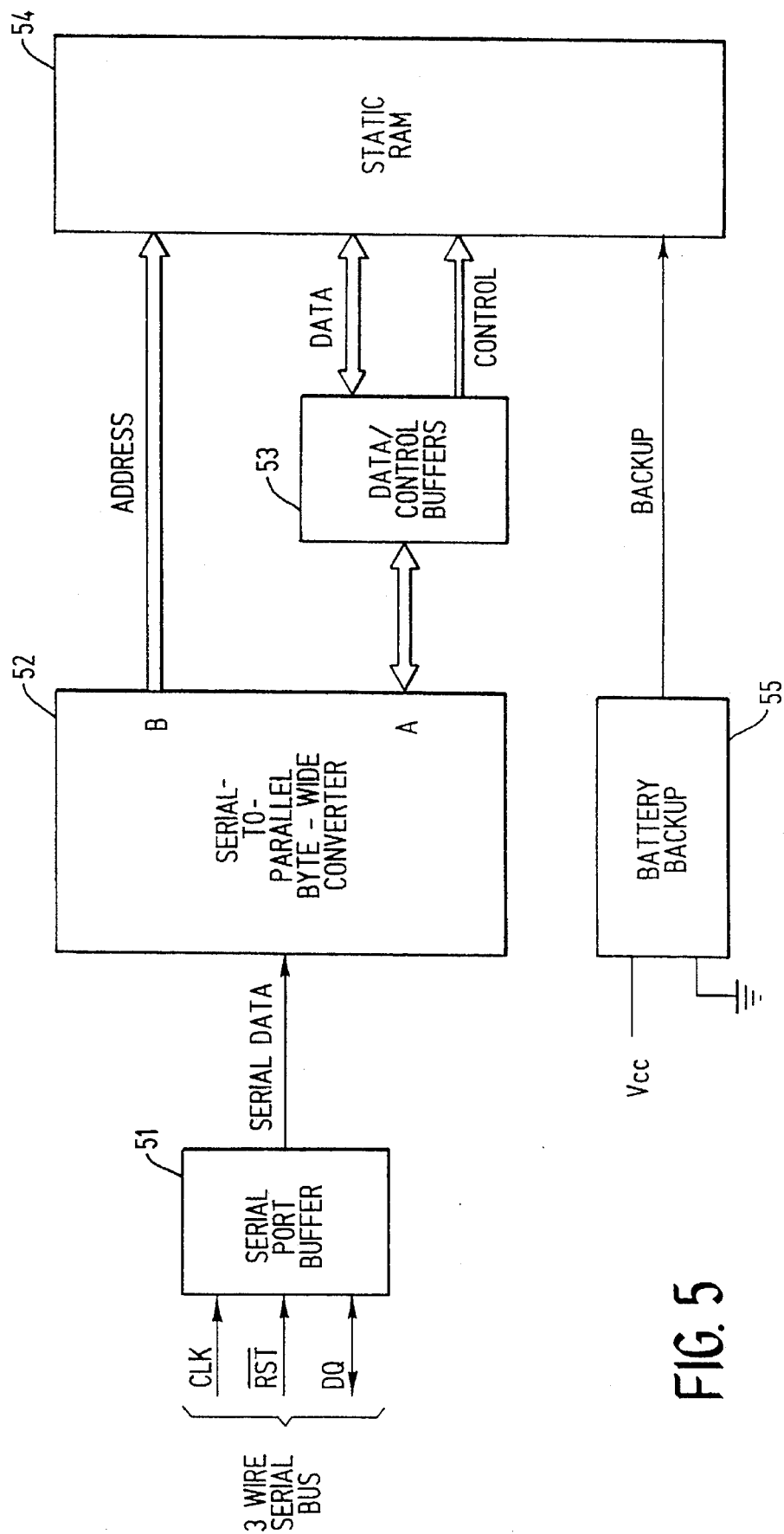
FIG. 5 is a detailed block diagram of a RAM card in accordance with the present invention.

FIG. 5 is a more detailed block diagram of the RAM card 20 in accordance with the present invention. A serial port buffer 51 serves as the electrical interface to the preferred 3-wire serial bus shown in FIG. 2. The serial port buffer 51 is coupled to a serial-to-parallel byte-wide converter 52, which converts serial data to and from byte-wide parallel data. The converter 52 responds to the clock signal CLK and $\overline{RST}$ input to accept data from or transmit data to the data line DQ. The converter 52 also controls a non-volatile memory 54 through the use of a data/control buffer 53, as provided by the manufacturer.

In the illustrated embodiment, the memory 54 is a static RAM with sustaining power supplied by a battery 55, permitting the RAM card 20 to be removed from the RAM card receptacle 21. The battery backup also protects against data loss if the power from the RAM card receptacle 21 is interrupted due to system failure or an accident.

If fixed-size data blocks are used, data stored in the memory 54 is delimited by an implicit block size. If variable-size data blocks are used, the data preferably contain internal record and field length counts and/or unique delimiters, so that the blocks can be read back in a meaningful manner. Such variable-size record structures are well-known in the art. However, for simplicity of implementation, the preferred embodiment of the invention uses fixed-size data blocks.

In operation, a RAM card 20 would be inserted into the RAM card receptacle 21. In the preferred embodiment, selected data would be gathered from the vehicle sensors 4*a* and/or the signal processing module 3 by the microcontroller 22, typically after the vehicle is started. The data is stored into the RAM card 20 by the microcontroller 22 at periodic intervals, which may be determined by time and/or by distance traveled. The microcontroller 22 may also do some computation on the data, such as determining a miles-per-gallon value or average speed, to derive processed data for storage in the RAM card 20.

In general, data blocks would be stored in the RAM card 20 beginning at the first location in the memory 54. The address is incremented to point to successive storage locations for storing subsequent data blocks.

Different modes of operation can be used. In a first mode, selected data is stored approximately every 0.5 seconds, until the memory 54 on the RAM card 20 is full (which, in the illustrated embodiment, takes about 15 minutes). Thereafter, the address sent to the RAM card 20 by the microcontroller 22 is reset to the first address used, causing the oldest data in the memory 54 to be overwritten with new data (i.e., the memory 54 is operated as a circular queue). This provides a "moving window" of the last 15 minutes of operation (or longer, if longer intervals or a larger capacity memory 54 are used). Recording can be stopped when external power to the RAM card 20 is turned off (for example, when the vehicle is turned off voluntarily or because of an accident), or when the vehicle is not moving. If desired, a delayed turn-off time can be used to continue recording for some period of time after external power is removed, to record, for example, such things as the engine coolant temperature as a measure of residual heat in the engine.

In a second mode of operation, the memory 54 is divided, in a static or dynamic fashion, into multiple logical "pages" for storing independent sets of data. A "current" page may be used to record a moving window of, for example, selected data from the last 5 or 10 minutes of operation, as described above for the first mode of operation. One or more additional pages can be used to record, for example, selected data (which need not be the same items of data stored in the current page) for fixed or variable time periods for later analysis. Such data may include, for example, information related to vehicle maintenance. In such a case, when a page fills up, writing stops, in order to preserve an archival record of the selected data. A page would be "reset" after a read-out of the data or upon execution of a specific command, permitting new data to be written to the page.

In one variation of the second mode of operation, a first page may be used to record a moving window of selected data. If an accident occurs, the first page of data is "frozen", and a next page is used for subsequent recording. An accident condition may be detected automatically, or indicated by activation of a manual switch. In this manner, data can be captured for later analysis of the accident.

In another variation of the second mode of operation, recording to a page other than the current page may be triggered by an unusual event, such as a vehicle operational or performance value exceeding a preset threshold value, or an accident. For instance, it may be desirable to record drive train sensor values only if one or more values, such as engine temperature, exceed a threshold value. As another example, such recording may be triggered by an unusual condition that may indicate an accident, such as a sudden acceleration or deceleration, sudden application of the brakes, activation of an air bag, etc. Recording can also be triggered manually. Recording such information on a separate page in memory, and only upon being triggered by a particular event, permits capturing data for later analysis of vehicle and/or driver performance.

In a third mode of operation, the recording rate may be increased upon the occurrence of an unusual condition, such as a sudden acceleration or deceleration, sudden application of the brakes, activation of an air bag, etc., in order to store more data values surrounding the event, for later analysis.

One skilled in the art would recognize that variations and combinations of these modes of operation could be implemented with the present invention as a matter of design choice.

The selected data may be any of the values mentioned above, or similar values. Further, not all of the values selected need be recorded at the same rate. For example, information that can change rapidly, such as the status of the brake system, vehicle speed, turning conditions, and other information useful for accident reconstruction purposes, may be recorded very frequently (e.g., every 0.2 seconds). Information that changes more slowly, or is less pertinent to accident reconstruction, such as engine temperature, coolant temperature, etc., may be recorded less frequently (e.g., every 5 seconds, or every mile).

To read out the data collected in the RAM card 20, the RAM card 20 is removed from the interface receptacle on the automotive system and inserted in a similar interface coupled to a personal computer. The data can then be displayed on the computer or stored on a different memory device, such as a floppy disk or a hard drive in the computer.

Figure 6:
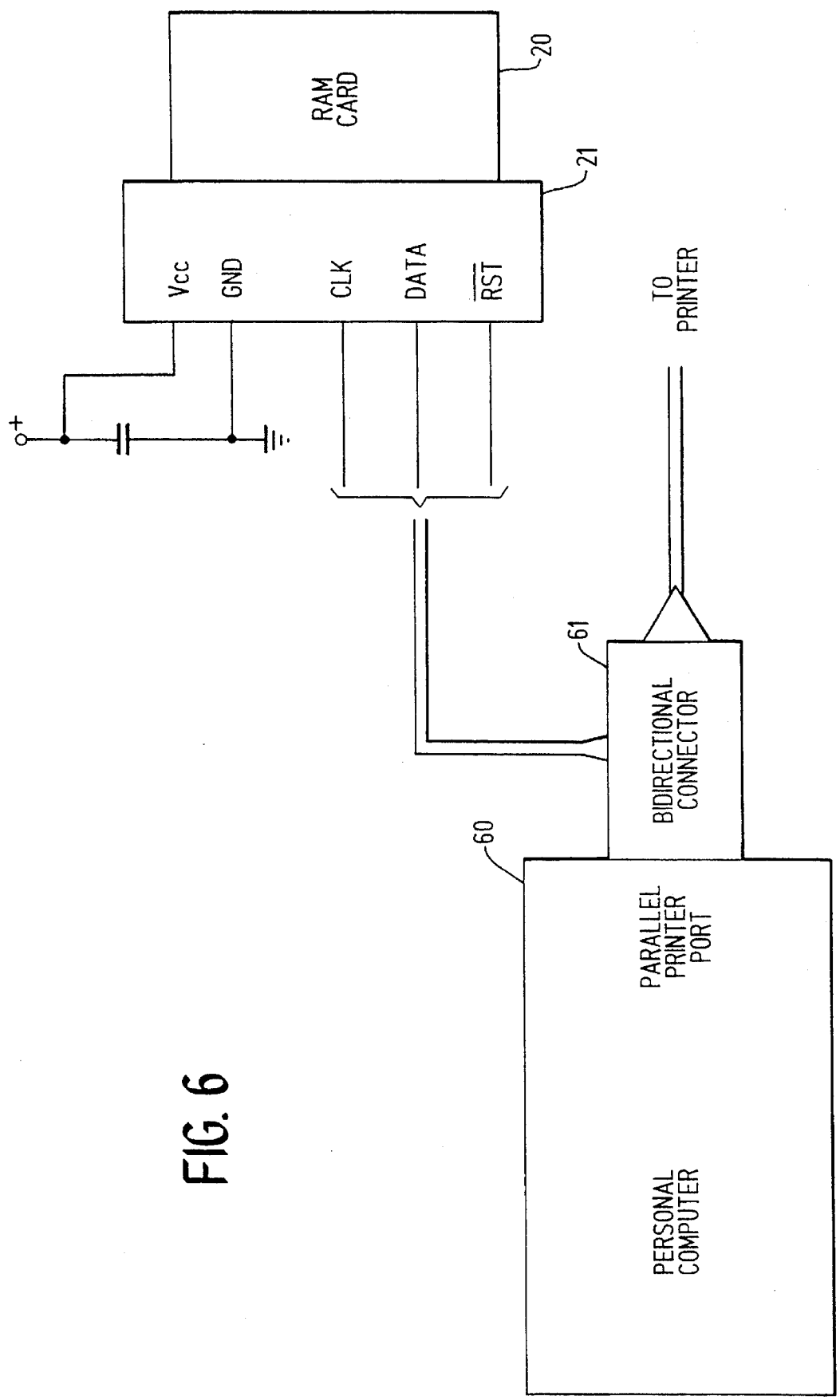
FIG. 6 is a block diagram of an interface between a RAM card in accordance with the present invention and a personal computer.

FIG. 6 is a block diagram of an interface between the RAM card 20 and a personal computer (PC) 60. An interface receptacle 21, identical to the interface receptacle 21 in the vehicle system, is coupled to a bidirectional connector 61 that is connected to a parallel port of the PC 60. The signal lines between the PC 60 and the RAM card 20 are preferably the standard 3-wire serial bus described above. The bidirectional connector 61 may also provide a parallel interface signal pass-through so that a standard parallel interface device, such as a printer (not shown), may still be coupled to the PC 60 through the parallel port. Such pass-through type connectors are well-known in the art.

When a RAM card 20 is removed from a vehicle system, the card is inserted into the interface receptacle 21 for data retrieval by the PC 60. Data is then read out of the RAM card 20 under control of the microcomputer of the PC, using the same process described above with respect to the microcontroller 22. That is, data is transmitted serially through the bidirectional connector 61, through the parallel port and to the microcontroller. The microcontroller converts the serial data to parallel form under software control, in known fashion.

Once data has been retrieved from the RAM card 20, it can be displayed on the PC in a variety of ways, such as in various tabular forms, depending on whether the information represents accident reconstruction information, trip monitoring information, maintenance information, or other information. The manner of presentation of the data is a matter of design choice.

Since the RAM card 20 is removable and relatively inexpensive, each driver of a particular vehicle, such as a fleet car or bus, could be given a personalized RAM card 20. Thus, the ERA invention can be used to monitor the performance of particular drivers, including characteristics such as average driving speed, braking and acceleration habits, typical "headway" distance (i.e., the distance from the vehicle immediately in front in the same lane, as determined by the radar system), etc.

As another aspect of the invention, the ERA can be used to provide an authorization function that prohibits unauthorized personnel from driving a vehicle. Since each driver can be given a personalized RAM card 20, each RAM card 20 can be "keyed" with an electronic "signature" to work only with a particular vehicle. Anyone without a RAM card 20 "keyed" to a vehicle could not drive the vehicle. The "keying" signature may be as simple or as sophisticated as desired, and may be, for instance, a numeric code stored in the first address of the memory 54 of the RAM card 20. A matching code would be stored in the non-volatile memory device 23. The microcontroller 22 would read the pre-stored code in the RAM card 20 and compare the code with the corresponding code read from the non-volatile memory device 23. If no match occurred, the vehicle would not be enabled to operate. In addition, each RAM card 20 may have an "expiration" date coded therein, such that the vehicle would not be enabled to operate if the card had expired.

As another example, in order to enforce mandatory rest stops, a RAM card 20 and microcontroller 22 combination could be programmed to disable the vehicle for a fixed period of time after a stop, or until an authorization code was provided by a dispatcher (such a code could be provided to the microcontroller 22 by means of a 10-key keypad, for example).

As another aspect of the invention, the ERA can be used to load upgraded or updated computer programs (software) into the vehicle system. In this mode of operation, new software is loaded into a RAM card 20 through, for example, a PC 60, before insertion of the RAM card 20 into a vehicle system. The microcontroller 22 in the vehicle system reads the new program data out of the RAM card 20, converts it from serial to parallel form, and stores it in the non-volatile memory device 23 coupled to the microcontroller 22. The uploaded software may be for an automotive electronic control system or an automotive radar system, or both. This feature circumvents the time consuming and cumbersome task of removing the control system from the vehicle to load a software upgrade.

This aspect of the invention can also be used to "customize" or "personalize" the operational characteristics of a vehicle to a driver's preferences. For example, each driver of a fleet vehicle or bus can use the RAM card 20 to upload into the vehicle the driver's preferences relating to desired headway distance, warning thresholds, or any other parameter that can be set through a vehicle's electronic control system.

Although the preferred embodiment of the invention is illustrated as being used in conjunction with an automotive radar system, it should be understood that the invention can be used in conjunction with any microcontroller-based or microcomputer-based automotive electronic system that gathers data about various vehicle performance and environment factors and can control the loading of such information into a memory device.

Further, as automotive technology progresses, the subsystems in a vehicle likely will communicate via a vehicle-wide system serial data bus. The ERA is able to accommodate this technological advance since the invention can be coupled to a serial system bus without major modification. This would allow the invention to record information from other subsystems on the serial bus for accident reconstruction, trip monitoring, or other tasks. The microcontroller 22 would be coupled to the system serial bus, and could either monitor activity on the bus and store relevant information it encounters, or take an active role on the bus by requesting relevant information from other subsystems and then storing such information.

As another aspect of the invention, a second ERA 5 could be mounted in a vehicle. A first ERA 5 system can be used to record information pertinent to the vehicle regardless of the identity of the driver (e.g., vehicle maintenance information), while a second ERA 5 system can be used to record information pertinent to each driver on the driver's personal RAM card 20. If desired, the first ERA 5 system may be non-removable, in which case the RAM card 20 and interface receptacle 21 can be replaced with a non-volatile RAM circuit directly coupled to the microcontroller 22.

Thus, the present invention records data until an event, such as an accident, stops the recording. In the preferred embodiment, the RAM card 20 can then be removed and the events leading up to the event read back using a standard personal computer with a matching interface. The invention is thus extremely useful for accident reconstruction as well as more standard vehicle performance, operational status, and/or environment data. In addition, the invention is configurable for a driver's particular preferences, and optionally provides an authorization function that prohibits unauthorized personnel from driving a vehicle, and provides a convenient means for upgrading system-wide software for an automotive electronic control system or an automotive radar system. The RAM card 20 also uses rugged and durable technology that is suitable for integration into an automotive system.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. An event recording apparatus for use in an automotive vehicle having at least one data generating means, each for sensing an environmental or an operational parameter of the automotive vehicle and for generating corresponding data values, comprising:

(a) a removable recording device including a non-volatile memory means for storing data, and a first interface means for transmitting data from the memory means and for receiving data for storage in the memory means;

(b) an interface adapter, adapted to removably receive the removable recording device and mounted in the automotive vehicle, and including a second interface means for transmitting data to the first interface means of the removable recording device;

(c) controller means fixed within the vehicle and, coupled to the interface adapter and to said at least one data generating means, for receiving data values from said at least one data generating means, and transmitting said received data values through the interface adapter for storage in the removable recording device, the controller means including means for reading data from the removable recording device;

wherein the data read from the removable recording device comprises at least one program to be executed only by the fixed controller means.

2. An event recording apparatus for use in an automotive vehicle environment, comprising:

(a) a removable recording device including non-volatile memory means for storing data, and a first interface means for transmitting data from the memory means and for receiving data for storage in the memory means;

(b) an interface adapter, adapted to removably receive the removable recording device and mounted in an automotive vehicle, and including a second interface means for transmitting data to the first interface means of the removable recording device and for receiving data from the first interface means of the removable recording device;

(c) at least one data generating means, mounted in an automotive vehicle, each for sensing an environmental or an operational parameter of the automotive vehicle and for generating corresponding data values;

(d) controller means, fixed within the vehicle and coupled to the interface adapter and to said at least one data generating means, for receiving data values from said at least one data generating means and transmitting said received data values through the interface adapter for storage in the removable recording device, the controller means including means for reading data from the removable recording device;

wherein the data read from the removable recording device comprises at least one program to be executed only by the fixed controller.

3. An event recording apparatus for use in an automotive vehicle having at least one data generating means, each for sensing an environmental or an operation parameter of the automotive vehicle and for generating corresponding data values, comprising:

(a) an electronic removable recording device including non-volatile memory means for storing data, and a first serial interface means for transmitting data from the memory means and for receiving data for storage in the memory means;

(b) an interface adapter, adapted to removably receive the removable recording device and mounted in the automotive vehicle, and including a second serial interface means for transmitting data to the first serial interface means of the removable recording device and for receiving data from the first serial interface means of the removable recording device;

(c) controller means, fixed within the vehicle and coupled to the interface adapter and to said at least one data generating means, for receiving data values from said at least one data generating means and periodically transmitting said received data values through the interface adapter for storage in the removable recording device, the controller means including means for reading data from the removable recording device;

wherein the data read from the removable recording device comprises at least one program to be executed only by the fixed controller means.

4. The event recording apparatus of claim 1, 2, or 3, wherein the controller means further includes means for enabling or disabling the automotive vehicle from operating, and wherein the data read from the removable recording device comprises an expiration code in response to which the controller means enables the automotive vehicle if the expiration code is valid, and disables the automotive vehicle if the expiration code is invalid.

5. The event recording apparatus of claim 1, 2, or 3, wherein the controller means further includes means for controlling functions of the automotive vehicle in response to data values read from the removable recording device.

6. The event recording apparatus of claims 1, 2, or 3, wherein the non-volatile memory means includes one of: dynamic RAM with a battery backup and refresh circuitry; static RAM with a battery backup; flash memory; and electrically alterable read-only memory.

7. The event recording apparatus of claims 1, 2, or 3, wherein the data stored in the removable recording device relates to events internal to the vehicle.

8. The event recording apparatus of claim 7, wherein the data relates to events internal to the vehicle selected from one or more of: a hazard level determined from a radar system mounted in the automotive vehicle; braking pressure; acceleration or deceleration in one or more dimensions; rate of turning; steering angle; cruise control status; brake temperature; brake line hydraulic pressure; average speed; miles-per-gallon; compass direction of travel; coolant temperature; oil temperature; engine temperature; transmission fluid temperature; engine timing; impact; tire pressure; windshield wiper status; fog light status; defroster status; and geographic positioning information.

9. The event recording apparatus of claims 1, 2, or 3, wherein the data stored in the removable recording device relates to events external to the vehicle.

10. The event recording apparatus of claim 9, wherein the data relating to events external to the vehicle is selected from one or more of: the closing rate between the automotive vehicle and targets located by a radar system mounted in the automotive vehicle; the distance between the automotive vehicle and such targets; and target direction.

11. The event recording apparatus of claims 1, 2, or 3, further including a computer interface adapter means, adapted to removably receive a recording device and adapted to be coupled to a computer, and including a third interface means for transmitting data from the computer to the first interface means of the recording device and for receiving data from the first interface means of the recording device.

12. The event recording apparatus of claims 1, 2, or 3, wherein the data stored in the removable recording device is normally stored at a first rate, but is stored at a second rate upon an occurrence of a selected event.

13. The event recording apparatus of claims 1, 2, or 3, wherein data storage is commenced upon an occurrence of a selected event.

14. The event recording apparatus of claims 1, 2, or 3, wherein data storage is terminated upon an occurrence of a selected event.

15. The event recording apparatus of claims 1, 2, or 3, wherein the non-volatile memory means includes multiple logical data pages for storing independent sets of data.

16. The event recording apparatus of claim 1, 2, or 3, further including a system non-volatile memory means for storing data read from the removable recording device.

17. The event recording apparatus of claim 3, wherein the first and second interface means communicate over a 3-wire serial bus.

18. A method for recording events relating to an automotive vehicle having at least one data generating means, each for sensing an environmental or an operational parameter of the automotive vehicle and for generating corresponding data values, comprising the steps of:
(a) providing a removable data storage card including non-volatile memory means for storing data, and a first interface means for transmitting data from the memory means and for receiving data for storage in the memory means;
(b) providing an interface adapter, adapted to removably receive the recording device and mounted in the automotive vehicle, and including a second interface means for transmitting data to the first interface means of the recording device and for receiving data from the first interface means of the recording device;
(c) receiving data values from said at least one data generating means;
(d) transmitting said received data values through the interface adapter;
(e) storing the transmitted data in the recording device;
(f) reading a computer program from the recording device; and
(g) executing the program only in a controller fixed within the vehicle.

19. The method for recording events of claim 18, further including the steps of:
(a) providing a computer interface adapter means, adapted to removably receive a recording device and adapted to be coupled to a computer, and including a third interface means for transmitting data from the computer to the first interface means of the recording device and for receiving data from the first interface means of the recording device;
(b) reading into a computer data stored in the recording device.

20. The method for recording events of claim 18, wherein the data stored in the removable recording device relates to events internal to the vehicle.

21. The method for recording events of claim 20, wherein the data relating to events internal to the vehicle is selected from one or more of: a hazard level determined from a radar system mounted in the automotive vehicle; braking pressure; acceleration or deceleration in one or more dimensions; rate of turning; steering angle; cruise control status; brake temperature; brake line hydraulic pressure; miles-per-gallon; fuel remaining; compass direction of travel; coolant temperature; oil temperature; engine temperature; transmission fluid temperature; engine timing; impact; tire pressure; windshield wiper status; fog light status; defroster status; and geographic positioning information.

22. The method for recording events of claim 18, wherein the data stored in the removable recording device relates to events external to the vehicle.

23. The method for recording events of claim 22, wherein the data relating to events external to the vehicle is selected from one or more of: the closing rate between the automotive vehicle and targets located by a radar system mounted in the automotive vehicle; the distance between the automotive vehicle and such targets; and target direction.

24. The method for recording events of claim 18, wherein the data stored in the removable recording device is normally stored at a first rate, but is stored at a second rate upon an occurrence of a selected event.

25. The method for recording events of claim 18, wherein data storage is commenced upon an occurrence of a selected event.

26. The method for recording events of claim 18, wherein data storage is terminated upon an occurrence of a selected event.

27. The method for recording events of claim 18, wherein the non-volatile memory means includes multiple logical data pages for storing independent sets of data.

28. An event recording apparatus for use in an automotive vehicle having at least one data generating means, each for sensing an environmental or an operational parameter of the automotive vehicle and for generating corresponding data values, comprising:

(a) a removable recording device having a non-volatile memory for storing data, and means for transmitting data from the memory and for receiving data for storage in the memory;

(b) controller means, fixed within the vehicle and coupled to the data storage unit and to said at least one data generating means, for receiving data values from said at least one data generating means and transmitting said received data values to the data storage unit for storage in the non-volatile memory, the controller means including means for reading data from the data storage unit;

wherein the data read from the data storage unit comprises at least one program to be executed only by the fixed controller means.

* * * * *

UNITED STATES PATENT AND TRADEMARK OFFICE
CERTIFICATE OF CORRECTION

PATENT NO. : 5,581,464
DATED : December 3, 1996
INVENTOR(S) : Woll et al

It is certified that error appears in the above-indentified patent and that said Letters Patent is hereby corrected as shown below:

In Claim 18 at line 5, please change "data storage card" to --recording device--.

Signed and Sealed this

Sixth Day of May, 1997

Attest:

BRUCE LEHMAN

Attesting Officer

Commissioner of Patents and Trademarks

REEXAMINATION CERTIFICATE (3729th)
United States Patent [19]
Woll et al.

[11] B1 5,581,464

[45] Certificate Issued Feb. 9, 1999

[54] RECORDING OF OPERATIONAL EVENTS IN AN AUTOMOTIVE VEHICLE

[75] Inventors: Jerry D. Woll, Poway; Bryan D. Woll, Laguna Niguel; Van R. Malan, La Jolla, all of Calif.

[73] Assignee: Vorad Safety Systems, Inc., San Diego, Calif.

Reexamination Request:
No. 90/004,740, Aug. 29, 1997

Reexamination Certificate for:
Patent No.: 5,581,464
Issued: Dec. 3, 1996
Appl. No.: 320,603
Filed: Oct. 11, 1994

Certificate of Correction issued May 6, 1997.

Related U.S. Application Data

[63] Continuation of Ser. No. 930,158, Aug. 14, 1992, abandoned.

[51] Int. Cl.[6] .............................. G06F 7/70; G06F 13/00; G06G 7/76
[52] U.S. Cl. ........................ 701/35; 701/29; 340/438; 340/439; 340/459; 180/287; 380/9; 380/30
[58] Field of Search ........................ 701/35, 33, 32, 701/29, 24, 31; 340/436, 438, 459, 870.16, 870.41, 425.5, 576, 521; 364/550, 551.01; 380/9, 30, 25, 49

[56] References Cited

U.S. PATENT DOCUMENTS

| | | | |
|---|---|---|---|
| 4,258,421 | 3/1981 | Juhasz et al. | 701/35 |
| 4,303,850 | 12/1981 | Juhasz et al. | 377/32 |
| 4,307,455 | 12/1981 | Juhasz et al. | 701/35 |
| 4,638,289 | 1/1987 | Zottnik | 701/35 |
| 4,757,454 | 7/1988 | Hisataka et al. | 701/35 |
| 4,853,850 | 8/1989 | Krass, Jr. et al. | 701/35 |
| 4,853,859 | 8/1989 | Morita et al. | 701/35 |
| 4,926,331 | 5/1990 | Windle et al. | 701/35 |
| 4,939,652 | 7/1990 | Steiner | 701/35 |

FOREIGN PATENT DOCUMENTS

0 172 553  2/1986  European Pat. Off. .......... G07C 5/10

*Primary Examiner*—Jacques H. Louis-Jacques

[57] ABSTRACT

An apparatus and method for recording operational events in an automotive radar system. The invention provides an Event Recording Apparatus (ERA) that records selectable vehicle performance, operational status, and/or environment information, including information useful for accident analysis and updated software for use by a system processor capable of reading data from the ERA. The preferred embodiment of the ERA comprises a non-volatile solid-state memory card, a memory card adapter located in a vehicle, and a microprocessor, either as part of the memory card or embedded in a system within the vehicle, for controlling the storage of data within the memory card. The ERA is configured to store such vehicle information as the closing rate between the recording vehicle and targets located by the vehicle's radar system, distance between the recording vehicle and targets, vehicle speed, and such vehicle operational status and environment information as braking pressure, vehicle acceleration or deceleration, rate of turning, steering angle, hazard levels determined from a radar system processor, target direction, cruise control status, vehicle engine RPM, brake temperature, brake line hydraulic pressure, windshield wiper status, fog light status, defroster status, and geographic positioning information. In addition, the ERA can be configured to function as a common trip monitor, recording distance travelled, average speed, miles-per-gallon, fuel remaining, compass direction of travel, etc. The device can also record vehicle maintenance information, such as oil temperature, engine temperature, transmission fluid temperature, and engine timing.

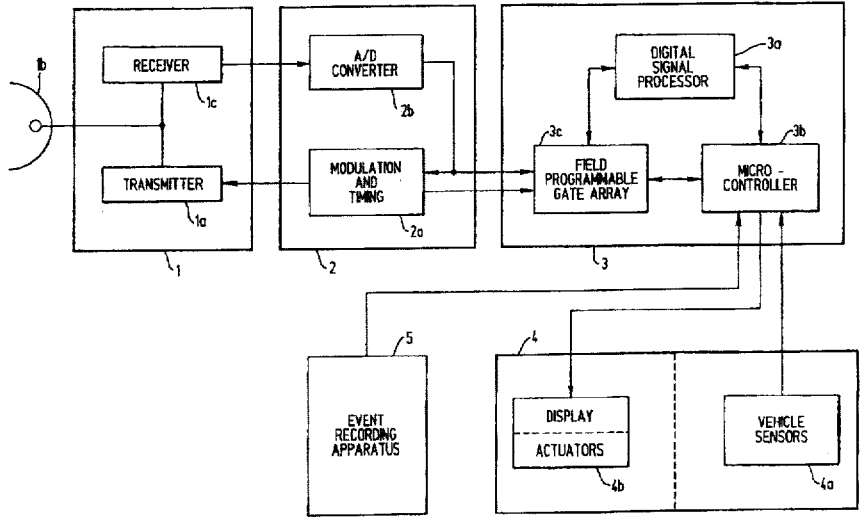

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 40–45:

Using the present [ERA] *Event Recording Apparatus (ERA)* invention in conjunction with such a radar system allows system allows recording of important data relating to obstacles in the path of the vehicle that were detected by the radar system. This type of information is particularly useful in accident reconstruction.

Column 4, lines 26–27:

Also coupled to the microcontroller 3b is an [Event Recording Apparatus (ERA)] *ERA* 5, described more fully below.

AS A RESULT OF REEXAMINATION, IT HAS BEEN DETERMINED THAT:

Claims 1–5, 7–10, 18, 20–23 and 28 are determined to be patentable as amended.

Claims 6, 11–17, 19 and 24–27, dependent on an amended claim, are determined to be patentable.

1. An event recording apparatus for use in [an] *a host* automotive vehicle having at least one data generating means, each for sensing an environmental or an operational parameter of the *host* automotive vehicle and for generating corresponding data values, comprising:
(a) a removable recording device including a non-volatile memory means for storing data, and a first interface means for transmitting data from the memory means and for receiving data for storage in the memory means;
(b) an interface adapter, adapted to removably receive the removable recording device and mounted in the *host* automotive vehicle, and including a second interface means for transmitting data to the first interface means of the removable recording device and for receiving data from the first interface means of the removable recording device;
(c) controller means fixed within the *host automotive* vehicle and, coupled to the interface adapter and to said at least one data generating means, for receiving data values from said at least one data generating means, and transmitting said received data values through the interface adapter for storage in the removable recording device, the controller means including means for reading data from the removable recording device;
wherein the data read from the removable recording device [comprises at least one program to be executed only by the fixed controller means] *includes information derived from a vehicle system for determining information regarding a target that is remote with respect to the host automotive vehicle.*

2. An event recording apparatus for use in [an] *a host* automotive vehicle environment, comprising:
(a) a removable recording device including a non-volatile memory means for storing data, and a first interface means for transmitting data from the memory means and for receiving data for storage in the memory means;
(b) an interface adapter, adapted to removably receive the removable recording device and mounted in [an] *the host* automotive vehicle, and including a second interface means for transmitting data to the first interface means of the removable recording device and for receiving data from the first interface means of the removable recording device;
(c) at least one data generating means, mounted in [an] *the host* automotive vehicle, each for sensing an environmental or an operational parameter of the *host* automotive vehicle and for generating corresponding data values *including at least one vehicle system for determining information regarding a target that is remote with respect to the host automotive vehicle*;
(d) controller means, fixed within the *host automotive* vehicle and coupled to the interface adapter and to said at least one data generating means, for receiving data values from said at least one data generating means and transmitting said received data values through the interface adapter for storage in the removable recording device, the controller means including means for reading data from the removable recording device;
wherein the data read from the removable recording device comprises at least one program to be executed only by the fixed controller *means*.

3. An event recording apparatus for use in [an] *a host* automotive vehicle having at least one data generating means, each for sensing an environmental or an operation parameter of the *host* automotive vehicle and for generating corresponding data values, comprising:
(a) an electronic removable recording device including non-volatile memory means for storing data, and a first serial interface means for transmitting data from the memory means and for receiving data for storage in the memory means;
(b) an interface adapter, adapted to removably receive the removable recording device and mounted in the *host* automotive vehicle, and including a second serial interface means for transmitting data to the first serial interface means of the removable recording device and for receiving data from the first serial interface means of the removable recording device;
(c) controller means, fixed within the *host automotive* vehicle and coupled to the interface adapter and to said at least one data generating means, for receiving data values from said at least one data generating means and periodically transmitting said received data values through the interface adapter for storage in the removable recording device, the controller means including means for reading data from the removable recording device;
wherein the data read from the removable recording device comprises at least one program to be executed only by the fixed controller means *and includes information derived from a vehicle system for determining information regarding a target that is remote with respect to the host automotive vehicle.*

4. The event recording apparatus of claim 1, 2, or 3, wherein the controller means further includes means for enabling or disabling the *host* automotive vehicle from operating, and wherein the data read from the removable recording device comprises an expiration code in response to which the controller means enables the *host* automotive vehicle if the expiration code is valid, and disables the *host* automotive vehicle if the expiration code is invalid.

3

5. The event recording apparatus of claim 1, 2, or 3, wherein the controller means further includes means for controlling functions of the *host* automotive vehicle in repsonse to data values read from the removable recording device.

7. The event recording apparatus of claims 1, 2, or 3, wherein the data stored in the removable recording device relates to events internal to the *host automotive* vehicle.

8. The event recording apparatus of claim 7, wherein the data relates to events internal to the *host automotive* vehicle selected from one or more of: a hazard level determined from a radar system mounted in the *host* automotive vehicle; braking pressure; acceleration or deceleration in one or more dimensions; rate of turning; steering angle; cruise control status; brake temperature; brake line hydraulic pressure; average speed; miles-per-gallon; compass direction of travel; coolant temperature; oil temperature; engine temperature; transmission fluid temperature; engine timing; impact; tire pressure; windshield wiper status; fog light status; defroster status; and geographic positioning information.

9. The event recording apparatus of claims 1, 2, or 3, wherein the data stored in the removable recording device relates to events external to the *host automotive* vehicle.

10. The event recording apparatus of claim 9, wherein the data relating to events external to the *host automotive* vehicle is selected from one or more of: the closing rate between the *host* automotive vehicle and targets located by a radar system mounted in the *host* automotive vehicle, the distance between the *host* automotive vehicle and such targets; and target direction.

18. A method for recording events relating to [an] *a host* automotive vehicle having at least one data generating means, each for sensing an environmental or an operational parameter of the *host* automotive vehicle and for generating corresponding data values, comprising the steps of:
(a) providing a removable recording device including non-volatile memory means for storing data, and a first interface means for transmitting data from the memory means and for receiving data for storage in the memory means;
(b) providing an interface adapter, adapted to removably receive the *removable* recording device and mounted in the *host* automotive vehicle, and including a second interface means for transmitting data to the first interface means of the *removable* recording device and for receiving data from the first interface means of the *removable* recording device;
(c) receiving data values from said at least one data generating means, *including information derived from a vehicle system for determining information regarding a target that is remote with respect to the host automotive vehicle*;
(d) transmitting said received data values through the interface adapter;
(e) storing the transmitted data in the *removable* recording device;

4

(f) reading a computer program from the *removable* recording device; and
(g) executing the *computer* program only in a controller fixed within the *host automotive* vehicle.

20. The method for recording events of claim 18, wherein the data stored in the removable recording device relates to events internal to the *host automotive* vehicle.

21. The method for recording events of claim 20, wherein the data relating to events internal to the *host automotive* vehicle is selected from one or more of: a hazard level determined from a radar system mounted in the *host* automotive vehicle; braking pressure; acceleration or deceleration in one or more dimensions; rate of turning; steering angle; cruise control status; brake temperature; brake line hydraulic pressure; miles-per-gallon; fuel remaining; compass direction of travel; coolant temperature; oil temperature; engine temperature; transmission fluid temperature; engine timing; impact; tire pressure; windshield wiper status; fog light status; defroster status; and geographic positioning information.

22. The method for recording events of claim 18, wherein the data stored in the removable recording device relates to events external to the *host automotive* vehicle.

23. The method for recording events of claim 22, wherein the data relating to events external to the *host automotive* vehicle is selected from one or more of: the closing rate between the *host* automotive vehicle and targets located by a radar system mounted in the *host* automotive vehicle; the distance between the *host* automotive vehicle and such targets; and target direction.

28. An event recording apparatus for use in [an] *a host automotive* vehicle having at least one data generating means, each for sensing an environmental or an operational parameter of the *host* automotive vehicle for generating corresponding data values, comprising:
(a) a removable [recording device] *data storage unit* having a non-volatile memory for storing data, and means for transmitting data from the memory and for receiving data for storage in the memory;
(b) controller means, fixed within the *host automotive* vehicle and coupled to the data storage unit and to said at least one data generating means, for receiving data values from said at least one data generating means and transmitting said received data values to the data storage unit for storage in the non-volatile memory, the controller means including means for reading data from the data storage unit;
wherein the data read from the data storage unit comprises at least one program to be executed only by the fixed controller means, *and wherein the data read from the data storage unit includes information derived from a vehicle system for determining information regarding a target that is remote with respect to the host automotive vehicle.*

\* \* \* \* \*